May 28, 1957
M. M. RINAKER
2,793,707
POLLUTION CONTROL APPARATUS
Filed Aug. 29, 1955
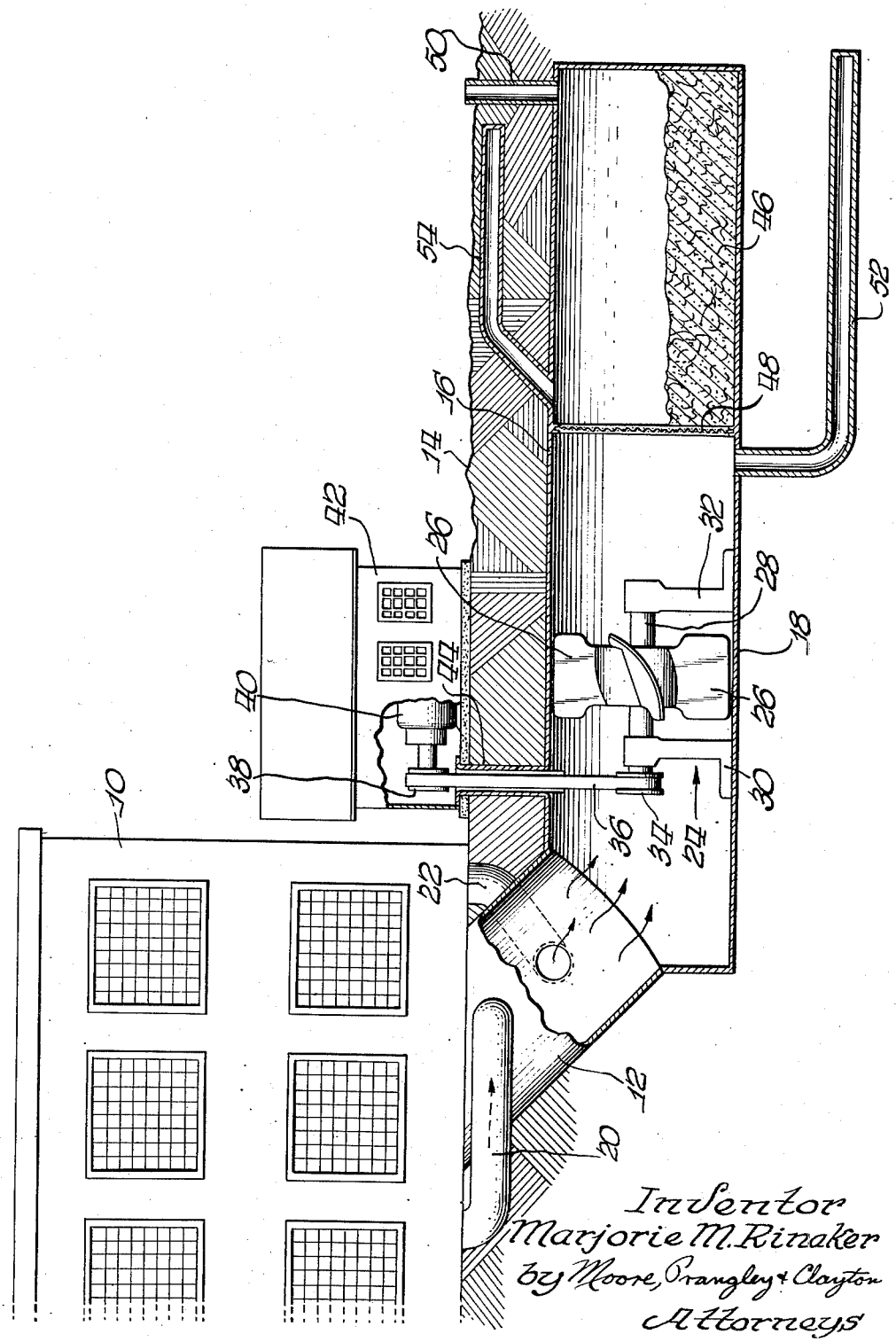
Inventor
Marjorie M. Rinaker
by Moore, Prangley & Clayton
Attorneys

United States Patent Office 2,793,707
Patented May 28, 1957

2,793,707

POLLUTION CONTROL APPARATUS

Marjorie M. Rinaker, Lake Forest, Ill.

Application August 29, 1955, Serial No. 531,202

2 Claims. (Cl. 183—2)

This invention relates to apparatus for controlling smog. More particularly it relates to apparatus for preventing polluting materials from escaping into the atmosphere.

It is common knowledge the pollution of air in and about the larger metropolitan areas is a serious problem which tends to become more acute as time goes on. When atmospheric conditions as in certain cities such as Los Angeles are such as to form what is called smog in such polluted atmospheres a serious health menace is created of greater or less duration depending upon the geography of the location. In certain areas the geography is such that the smog tends to hang over the area for long periods instead of being carried away by movements in the atmosphere.

Since the geography cannot be changed and atmospheric conditions cannot be controlled the problem of air pollution and smog will continue so long at polluting materials are permitted to escape into the atmosphere. Recognizing this, various efforts have been made to decrease the quantity of pollution discharged into the air but to date no completely satisfactory method or apparatus has come to light.

It is an object of this invention to provide an effective apparatus for preventing pollution from being discharged into the atmosphere.

A further object is to provide apparatus for treating gases containing polluting material to remove the latter therefrom before discharging such gases into the atmosphere.

Other objects will appear hereinafter.

These and other objects and advantages of the invention will be better understood from the following description when taken in conjunction with the accompanying drawing which forms a part of this specification. The single figure in the drawing shows more or less diagrammatically and partially in cross section one embodiment of the invention.

In the drawing the building 10 represents the factory or other place where material is produced or must be disposed of and if released into the atmosphere would cause pollution. For example, such factory 10 may house a furnace from which polluting or polluted gases are exhausted. In accordance with the present invention a large pipe or conduit 12 is provided which extends from the building or other source of pollution 10 down underneath the ground, that is, down into the earth, the ground level being indicated at 14. The polluting material to be exhausted is directed or drawn into the upper end of the pipe or conduit 12 which, for example, has an inside diameter of the order of 10 feet and may be simply a continuation or extension of the chimney or flue of a furnace operated within the building 10. The conduit 12 may be formed of any desired material such as metal or clay or ceramic material or a combination of these depending upon the nature of the corrosive conditions to which it will be exposed.

As seen in the drawing, the pipe 12 communicates at its lower end with an elongated underground chamber or tunnel 16 which is preferably enclosed by a housing 18 which similarly may be formed of any desired material depending upon the conditions of use. The tunnel 16 may be located any desired depth underground but preferably is placed above the water line. Although the pipe 12 is shown as extending at an angle with respect to the length of the passageway or chamber 16 it is to be understood that this particular arrangement is merely illustrative and that any other may be used as desired.

To facilitate the introduction of treating materials which will aid in dissipating the pollution, a pair of conduits 20 and 22 are provided which communicate at their upper ends with sources of treating solutions which are not shown and at their lower ends with the interior of the pipe 12. Through these conduits 20 and 22 solutions of acid or alkaline materials or of other materials may be introduced into the polluting material passing through the pipe 12 to aid in dissipating the pollution. While the tunnel 16 may be of any desired shape, it is preferably made cylindrical and of substantial size, for example, a cylindrical tunnel having a diameter of the order of 15 feet and a length of the order of 45 feet may be used.

Located within the tunnel 16 adjacent to the pipe 12 is a large fan designated generally 24 and comprising a series of fan blades 26 supported on a shaft 28 journaled at its opposite ends in a pair of supporting members 30 and 32 mounted on the lower portion of the wall of the tunnel 16. Through a pulley 34 fixed on the end of the shaft 28 the fan blades are rotated by a belt 36 which passes over a second pulley 38 fixed on the shaft of a motor 40 preferably located in a small house 42 on the ground level. As may be seen, a small passageway 44 is provided between the house 42 and the tunnel 16 to accommodate the two reaches of the belt 36.

The right-hand end of the tunnel 16 as viewed in the drawing contains a bed or body of finely divided mineral material 46 such as small 1-inch stones, loose gravel or cinders. This body of material is maintained in place by a circular section of fine screen 48 extending over the entire inner cross-sectional area of the tunnel 16 and supported on the walls thereof. The screen may be of any desired type but the openings therein should be small enough to prevent the escape of the finely divided mineral material 46. While the bed of mineral material 46 may occupy any desired portion of the tunnel 16, it is preferred that it occupy approximately one-third of the length of the tunnel and have a depth approximately equal to one-third the diameter of the tunnel.

At the far end of the tunnel over the bed of finely divided mineral material 46 a vent pipe 50 extends up from the tunnel 16 to above the ground level. Air or gaseous material from which the pollution has been dissipated in the tunnel 16 may pass up through this pipe 50 and enter the atmosphere.

In some instances pollution may not be completely dissipated in the tunnel 16 by the body of mineral material 46 and in order to aid in dissipating the residue a series of porous clay pipes such as the pipes 52 and 54 is provided. The series of pipes 52 communicates with the interior of the tunnel 16 in the chamber in which the fan is located, as indicated in the drawing, and the series of pipes 54 communicates with the chamber in which the bed of finely divided material 46 is positioned.

As indicated above, the material containing the pollution enters the tunnel 16 through the pipe 12. The fan 24 in addition to aiding in drawing in the material through the pipe 12 serves to create a condition of turbulence in the tunnel 16 and to drive the material containing the pollution into the bed of finely divided mineral material 46. A portion of the polluted material may enter either the pipes 52 or 54 and be dissipated in that manner or, if these pipes are not used, the pollution will be forced into the bed 46 in which it is dissipated, the air or other gaseous material from which pollution has been removed or dissipated being free to escape to the atmosphere through the vent 50.

It will be apparent, of course, that the particular dimensions given for the embodiment shown in the drawing are merely illustrative and that they may be as small or as large as desired, depending upon the requirements in any particular situation. Since the pollution to be dissipated will vary widely in character as well as in density depending upon the source, a variety of different chemical agents will be usable to assist in destroying the pollution. In the alternative, in some instances chemical treatment will not be required and the pollution may be dissipated by the turbulence of the air in the tunnel 16.

The advantages of the invention will in large part be apparent from the above description. By removing or dissipating pollution before it can enter the atmosphere the problem of polluted air and smog is solved at its source. As is readily apparent, the device is simple in character and construction and inexpensive.

It is apparent that many widely different embodiments of this invention may be made without departing from the spirit and scope thereof and, therefore, it is not intended to be limited except as indicated in the appended claims.

I claim:

1. Apparatus for dissipating pollution comprising an underground tunnel, a first compartment in said tunnel, means for introducing a stream of polluted air into said compartment, means in said compartment for creating turbulence therein and for drawing the polluted air therethrough, means for introducing solutions of acid, alkalies and other treating agents into said stream of polluted air before it enters said compartment, a second compartment in said tunnel communicating with said first compartment, mineral material in said second compartment, and at least one porous clay pipe extending out from said first compartment and leading into the earth surrounding the tunnel.

2. Apparatus of claim 1 wherein at least one porous clay pipe extends out from said second compartment and leads into the earth surrounding the tunnel.

References Cited in the file of this patent

UNITED STATES PATENTS

| | | |
|---|---|---|
| 1,891,170 | Nose | Dec. 13, 1932 |
| 2,074,283 | Stauber | Mar. 16, 1937 |
| 2,242,378 | Vollbach et al. | May 20, 1941 |